Figure 1:
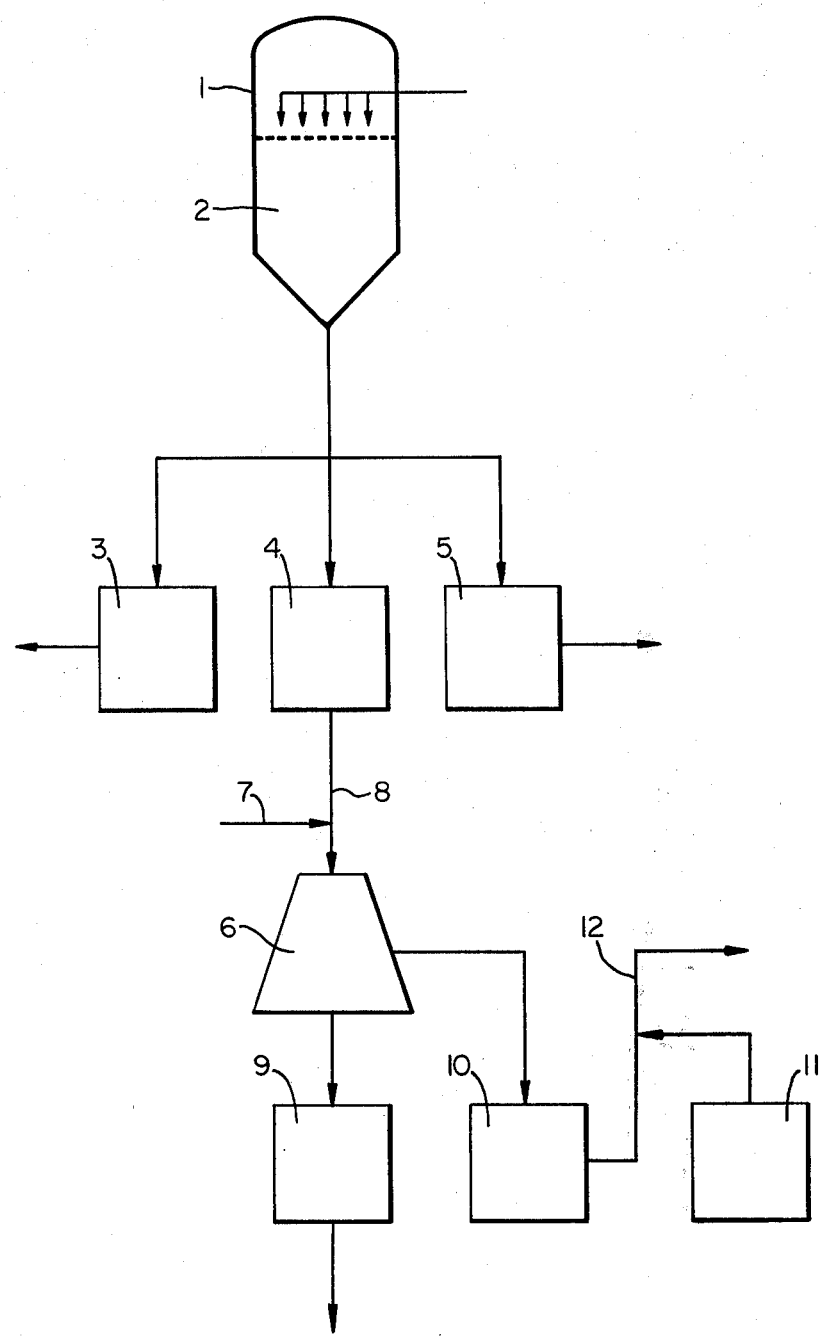

United States Patent [19]

Broddevall

[11] 4,213,820
[45] Jul. 22, 1980

[54] TREATMENT OF EFFLUENTS IN A CHLORINE BASED PULP BLEACHING PLANT

[75] Inventor: Bengt G. Broddevall, Skoghall, Sweden

[73] Assignee: Uddeholms Aktiebolag, Hagfors, Sweden

[21] Appl. No.: 749,102

[22] Filed: Dec. 9, 1976

[30] Foreign Application Priority Data

Mar. 18, 1976 [GB] United Kingdom ............... 10990/76

[51] Int. Cl.$^2$ ............................................. D21C 11/00
[52] U.S. Cl. ............................... 162/29; 162/DIG. 8; 210/28; 210/51
[58] Field of Search .................. 162/29, DIG. 8, 88, 162/89, 60; 210/37 R, 28, 51

[56] References Cited

U.S. PATENT DOCUMENTS

| 3,990,969 | 11/1976 | Broddevall | 162/30 R |
| 4,000,033 | 12/1976 | Nicolle et al. | 162/29 |

FOREIGN PATENT DOCUMENTS

| 2243141 | 3/1973 | Fed. Rep. of Germany | 210/37 R |
| 381481 | 12/1975 | Sweden . | |

*Primary Examiner*—William F. Smith
*Attorney, Agent, or Firm*—Murray and Whisenhunt

[57] ABSTRACT

An improved method for purifying dark colored chlorine containing effluents from a chlorine based pulp mill bleaching plant is disclosed, wherein the purification process involves treating the effluent in a bed containing a particulate weakly basic anion exchange and/or absorbent resin which takes up the colored lignin degradation products in the effluent until the resin has been saturated with pollutants to a given degree, whereupon the resin bed is eluted by means of an alkali solution. At least a fraction of the eluate which is released from the resin bed during the elution is acidified to a pH of less than 2, so that the majority of the total solids of the acidified effluent is precipitated, the precipitate is separated from the residual acidic liquor which contains the majority of the inorganic chlorine of the acidified eluate, and the precipitate then may be suitably transferred to a recovery plant of the pulp mill for eventual disposal.

The purification process permits the chlorine content of the eluate to be reduced to such an extent that the precipitate can be transferred to the recovery plant without substantial risk of corrosion damage. Thus pulp mills which have undesirably high chlorine concentrations in their bleach plant effluents may use the ion exchange and/or absorbent resin purification method without substantial corrosion damage to the recovery plant. Furthermore, this permits the use of hydrochloric acid solutions as activating agents for the resin bed, which permits the most economic selection of activation agents.

9 Claims, 2 Drawing Figures

TREATMENT OF EFFLUENTS IN A CHLORINE BASED PULP BLEACHING PLANT

This invention relates to treatment of effluents in a chlorine based pulp bleaching plant. Particularly the invention is concerned with the treatment of eluates discharged from resin beds provided for the purification of said effluents. These eluates in a concentrated form contain pollutants which have been taken up by the resin from the effluents by an adsorption and/or by an ion exchange mechanism.

The effluents that arise in the various stages of the chlorine based bleaching process contain various types of pollutants. Particularly dark coloured pollutants at discharge of the effluents, without purification, into rivers, lakes or the sea can cause severe environmental pollution. Particularly the first alkali extraction stage of the bleaching cycle contains large amounts of dark coloured pollutants as well as compounds having high oxygen demand. Considerable attention therefore has been focused upon the treatment of effluents comprising the effluent from the first alkali extraction stage to reduce environmental pollution.

One efficient method for the treatment of effluents from pulp mill bleaching plants in order to reduce the contents of pollutants is based on the use of adsorbent and/or ion exchange resins. Various types of resins have been suggested and are used in practice but the best results so far have been achieved by means of particulate weakly basic anion exchange resins having pendant amino groups.

Regardless what kind of resin that is used for the purification the aim is to take up organic compounds existing in the effluent upon the resin while ionic chlorides (inorganic chlorine), that is mainly chlorine as NaCl shall pass through the resin bed. Particularly lignin degradation products are taken up by the resin. Successively the ability to the resin to take up the lignin degradation compounds is reduced until the resin bed has been saturated. By the addition of an alkaline solution at the end of each purification cycle followed by a washing treatment the lignin degradation products, which are deeply dark coloured, are displaced and released from the resin bed. This operation is called elution and the liquor obtained is called eluate.

In the case of the treatment of effluents from a chlorine based bleaching plant the dark coloured eluate contains organochlorine compounds as well as inorganic ionic chloride.

Chlorides in high concentrations in the recovery system of the pulp mill, i.e. in the evaporation plant and in the recovery boiler, involve great risks for corrosion damages. Therefore one objective of the present invention is to reduce the contents of chlorine in the eluate which will be disposed of by burning in the recovery boiler.

Another problem is that the eluate contains excess water. The organic contents of the eluate therefore should be more concentrated before burning in the recovery boiler. According to prior art this is performed in the evaporation plant of the recovery system. But evaporation of great water volumes means considerable losses of energy. A transfer of the chlorine containing eluate into the evaporation plant also involves a risk for corrosion problems in the evaporation plant.

We have now found that it is possible to solve the above mentioned problems by precipitating pollutants from the eluate by acidification so that at least a great portion of the pollutants is contained in the eluate precipitate, and separating the precipitated pollutants from the residual liquor which thereafter advantageously can be utilized for acidifying purposes in the integrated purification process.

The pH required for precipitation to occur depends on the concentration of pollutants in the eluate. If the pH of the eluate is not reduced to below 2, then an efficient precipitation is not obtained for any concentration of pollutants in the eluate. On the other hand, provided that the pH is reduced to below 2, we find that efficient precipitation can occur and that it is possible by centrifugation or other conventional separation means to separate the precipitated pollutants from the residual liquor. Normally it is necessary to reduce the pH to between 0.5 and 1.5 to obtain an efficient precipitation of the pollutants in the eluate.

A series of acidic materials can be used to reduce the pH of the eluate to a value necessary for an efficient precipitation. In practice, use can be made of such mineral acids as sulphuric or hydrochloric acid. These acids can be used in any convenient proportion and strength so as to reduce the pH of the eluate to below 2, or to between 0.5 and 1.5. We find, in practice, that it is particularly convenient to use the so-called rest acid which occurs in large quantities as a by-product in the production of chlorine dioxide which is used in the $D_1$ and $D_2$ stages of the chlorine based bleaching of wood pulp. Rest acid is an aqueous acidic solution having a pH usually below 1 containing sulphuric acid and sodium sulphate. This is regarded as a waste material arising in the chlorine based bleaching process and its use in the present process represents a considerable economic advantage.

The precipitate obtained by the acidification can be easily separated from the eluate by conventional separation means such as centrifugation or filtration. Centrifugation is preferred and this can be carried out in such a way as to produce a slurry of pollutants containing in excess of 25% solid material together with a residual filtrate which is a partially purified highly acidic liquor.

The exact solids content in the precipitated pollutants is mainly a matter of choice, depending upon the separation means used and one very convenient procedure to adopt is to take the precipitated pollutants to a relatively high solids content, to separate this from the residual acidic liquor and then to dissolve the separated solid pollutants in a stream of black liquor which is to be passed to the furnace of the recovery boiler. In this way, there is no need to concentrate the alkaline eluate from the resin by evaporation before burning.

The acidified residual liquor obtained in the form of a filtrate, or more particularly in the form of a centrifugate, after the separation of the precipitate can be recycled for further use in the purification process. For example, the acidified residual liquor can be recycled to the precipitation step and used, together with fresh rest acid to precipitate pollutants. Alternatively, the acidified residual liquor can be used to activate the resin bed after elution and before use in decolourising further effluent.

During the resin elution process, we have analysed small samples of eluate from the first three bed volumes of eluate released from the resin bed to determine how i.a. the pH, the colour and the chlorine content of the eluate varies. We find that for about the first 1.4 bed volumes of eluate, the pH remains fairly constant at a rather low or moderate level. Then the pH climbs rapidly so that a pH of 12-13 is achieved by about 1.5-1.8 bed volumes and this pH is maintained for all subsequent eluate. The colour content of the eluate remains very low and relatively constant for about the first bed volume and then begins to rise rapidly until a maximum colour is achieved in the samples when about 1.2 bed volumes of eluate have been released. The colour content then begins to fall away until it resumes its initial low level at about 1.8 to 2.4 bed volumes. In our experiments, we have found that the colour peak in the eluate occurs shortly before the eluate achieves its maximum pH value of about 12-13. The curves may have individual shapes depending on the type of acid used for activation of the resin, but the characteristic features of the curves according to the experiments are the same regardless type of acid.

These experiments suggest that it is not necessary to acidify the whole 2 to 3 bed volumes of eluate to precipitate the pollutants. It is preferred to take a central cut of eluate and, because the colour content in the eluate climbs rapidly, passes through a peak and then falls back to its original value quite rapidly, it is preferred to take a central cut containing this peak and a volume of eluate falling either side of the eluate colour peak. That quantity of eluate which is first released from the resin bed, which eluate quantity may be called the fore-cut, normally may be used for acidifying purposes due to its low pH value. For example it can be recycled and mixed with the effluent in order to adjust the pH value of the effluent prior to purification in the resin bed.

The outercut following the central cut will also be a relatively colourless eluate but this eluate portion will have a pH of approx. 12-13 and will normally be used as an eluation agent in the regeneration of the resin bed.

In a further possible development of the process according to the invention, the central cut, containing for example 75-90% of all of the dark coloured pollutants eluated from the resin, can itself be divided into two fractions, a first fraction containing about the first 50-80% by volume of the central cut and a second fraction containing about 20% to 50% by volume of the central cut and having a higher pH than the first fraction. The first fraction can be subjected to acidification and precipitation in accordance with the present invention and the second fraction can be transferred to the evaporation before the final disposal by burning. The second fraction can also be used to dissolve the precipitate derived from the first fraction.

Experiments also have shown that it is possible by changing the flow rate of the eluting agent to displace the pH curve in relation to the colour peak. This suggests another possible developed embodiment of the process of the invention, namely that by adjusting the flow rate of eluting agent the pH value is maintained at a low level during the main part of the colour peak. More particularly this adjustment means that the flow rate of eluting agent is increased so that the rate of eluting agent will be greater than the flow rate of effluent during the purification phase of the cycle.

An example is given in the following with reference to the drawings in which

Figure 2:
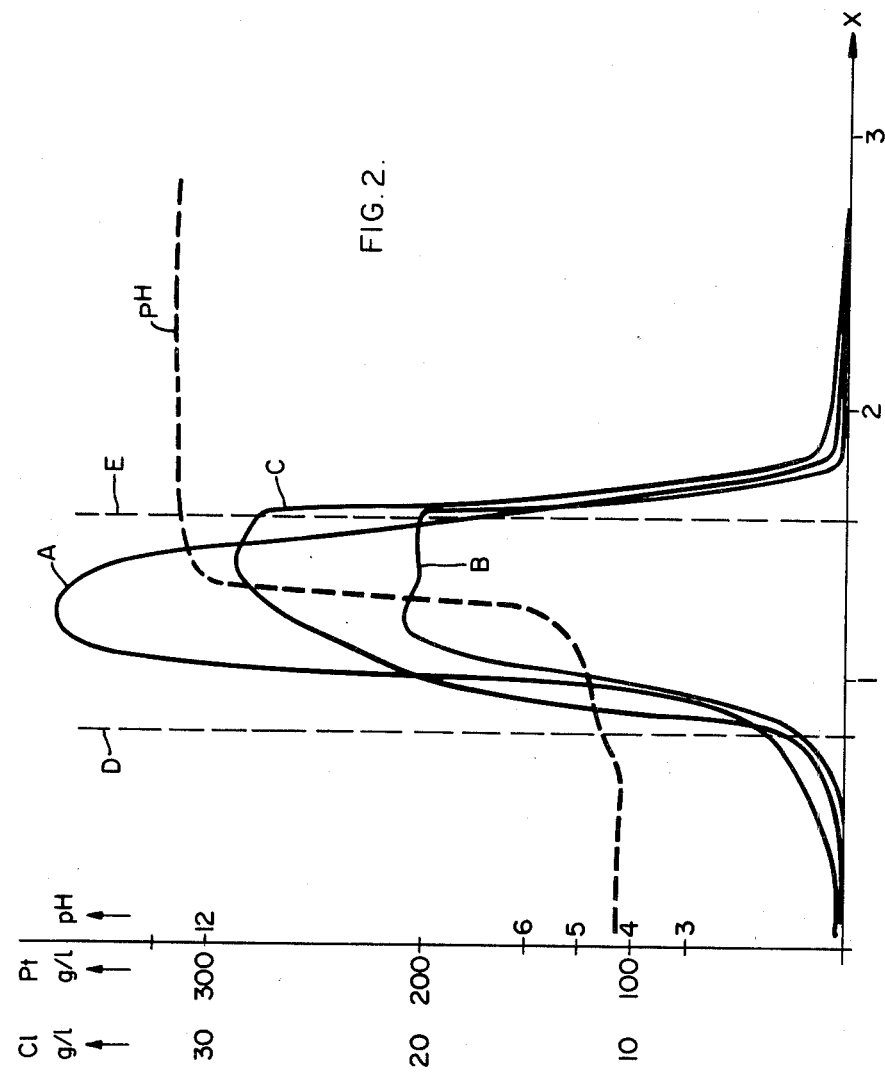

FIG. 1 is a flow diagram illustrating the process according to the invention, and FIG. 2 shows the pH value and the content of colour and chlorine in the eluate released during the course of elution.

In FIG. 1 an ion exchange column is designated 1. Column 1 contains a bed 2 of a particulate, weakly basic anion exchange resin. In the example the resin was a phenolic resin containing pendant amino ion exchanging groups. A sample of an effluent arising from the $E_1$ stage of a chlorine based bleaching plant of a pulp mill producing about 200 tons of bleached pulp per day was purified by passage through the resin bed 2 in coloumn 1. In the experiment there was used 250 ml of the ion exchange resin. Prior to purification of the effluent the resin bed had been activated by means of C-stage effluent from the bleaching plant. This effluent contains hydrochloric acid as an activation agent. When 24 bed volumes of $E_1$ effluent had passed through the bed the resin bed was loaded with coloured pollutants. Thereafter the resin bed was eluted by means of a NaOH-solution followed by washing with water. The pH value; colour; inorganic chlorine (chlorine as NaCl) and total chlorine content; KMnO$_4$-index; sodium; and dry substance of the eluate was analysed. FIG. 2 in the form of curves shows the pH value and the contents of colour and chlorine of the eluate during the course of elution. As is seen in the diagram the pH of the eluate is fairly constant and moderate, pH about 4.5 during about the first 1.3 bed volumes of eluate. Then pH is abruptly increased and reaches its max value of about 12.5 after totally about 1.4 bed volumes. In the diagram curve A represents the colour content and curves B and C represent inorganic chlorine (chlorine as NaCl) and total chlorine content of the eluate, respectively. The colour peak is reached shortly before the abrupt increase of pH.

The chlorine content also shows a pronounced peak which substantially overlaps the colour peak. The main part of chlorine, however, is in the form of inorganic chlorine while only a minor portion apparently is bound in the form of organic compounds. Therefore by precipitating the pollutants in the eluate it is possible to avoid a substantial part of the chlorine to be incorporated in the precipitate which in the first place will consist of lignin degradation products and other organic compounds.

Suitably only a central cut, the cut between the lines D and E in FIG. 2, is acidified which will be sufficient to precipitate the majority of the total quantity of pollutants in the total eluate. This central cut is transferred to a storage container 4, FIG. 1. The fore-cut corresponding to the eluate to the left of line D in FIG. 2 is fed to a storage container 3 and the outer cut, corresponding to the eluate falling to the right of line E in FIG. 2, will be fed to a storage container 5. The acidic liquor in container 3 suitably is recycled and mixed with incoming effluent in order to adjust the pH of the effluent prior to purification. The alkaline liquor in the container 5 on the other hand may suitably be used as an eluting agent or as a washing liquor after elution of the resin bed.

According to the preferred embodiment of the process of the invention the central cut, i.e. the liquor in container 4 is fed through a centrifuge 6. Therebefore, however, the organic pollutants in the liquor are precipitated by means of a strong acidic solution which is fed through a conduit 7 into and mixed with the eluate in conduit 8 prior to entry into centrifuge 6. In centrifuge 6 the precipitate is separated from residual liquor. In the example the eluate was acidified to a pH value of about 1. The residual liquor therefore was strongly acidic. The precipitate was fed to a container 10 and was finally dissolved by mixing with black liquor in a conduit 12. A storage container for black liquor is designated 11.

The contents of the various pollutants in the central cut of the eluate and in the fractions falling either side of the central cut are given in Table 1.

Table 1

|  | Central cut | Fore-cut + Outer cut | Total eluate |
|---|---|---|---|
| Total chlorine kg/t* | 9.60 | 1.87 | 11.47 |
| Inorganic chlorine (chlorine as NaCl) kg/t | 6.66 | 1.36 | 8.03 |
| Colour,Pt kg/t | 96.6 | 16.57 | 113.17 |
| $KMnO_4$-index kg/t | 51.22 | 4.77 | 56.0 |
| Na+ kg/t | 8.98 | 2.09 | 11.07 |
| TS**% | 8.25 | 0.90 | 3.33 |
| Ash % | 4.00 | 0.45 | 1.3 |

*According to what is usual in this technology the contents of pollutants are referred to per metric tons of bleached pulp.
**TS = Total solid (dry substance)

The central cut was acidified by means of $H_2SO_4$ to a pH ≈ 1.0. There was obtained a precipitate which was separated by means of a centrifuge. The contents of chlorine and of solids before and after precipitation and centrifugation are given in Table 2.

Table 2

|  | Total eluate | Central cut | Pre-cipitate | Centrifugate |
|---|---|---|---|---|
| Total chlorine kg/t | 11.40 | 9.60 | 1.90 | 7.70 |
| Inorganic chlorine (chlorine as NaCl) kg/t | 8.03 | 6.66 | 0.90 | 5.80 |
| TS,% | 3.33 | 8.25 | 23.0 | low |

These figures show that by precipitation through acidification and separation the total quantity of chlorine in the central cut can be reduced by 80%. In relation to the total eluate the reduction of total chlorine is about 84%. Corr. figures for inorganic chlorine are 86% and 89%, respectively. The dry substance content has increased from 3.33% as an average in the eluate, and from 8.25% in the central cut to 23.0% in the precipitate, corresponding to an increase of about 7 and 4 times, respectively.

The experiment shows that by precipitating at least the most polluted fraction of the eluate through acidification followed by separation of the precipitate it is possible to reduce the chlorine content to such extent that the precipitate can be transferred to the recovery plant without risk for corrosion damages. This will make it possible also for pulp mills which already have too high chloride concentrations in their bleaching plant effluents to use the ion exchange and/or adsorbent resin purification method referred to in the preamble of this specification.

The experiment also shows that it is possible without expecting corrosion problems to use HCl-solutions as activation agents for the resin bed, which suggests the use of the effluent from the wash filter of the $Cl_2$-bleaching step (the C-step) of the bleaching plant. This possible use of the C-step effluent of course has a favourable impact on the running costs of the process according to the invention.

I claim:

1. In a process for purifying a dark colored effluent of a chlorine based pulp mill bleaching plant, said effluent containing chlorine and colored lignin degradation product pollutants, said process comprising passing the effluent through a resin bed of an activated particulate, weakly basic anion exchange resin to retain said colored lignin degradation product pollutants in the resin bed until the resin has become saturated with said pollutants to a given degree, eluting the resin bed with an alkaline solution to release said pollutants therefrom, and disposing of the eluate, the improvement comprising separating the eluate released from the resin bed into fractions by color pattern, said fractions comprising a fore-cut (start fraction), an outer cut (end fraction) and a central cut, wherein the central cut comprises that portion of the eluate between about the first bed volume of eluate to about 1.8 to 2.4 bed volume of eluate, said central cut containing that portion of the eluate having the highest color concentration of any portion of the eluate and also containing a volume of eluate on either side of said portion of the eluate, and acidifying said central cut to a pH of less than about 2 to precipitate at least a majority of the total solids of the acidified effluent without precipitating solids in said fore-cut or said outer cut, separating the precipitate from the remainder of the central-cut, said remainder containing the majority of inorganic chlorine of said central cut, and disposing of said precipitate.

2. Process according to claim 1, wherein said resin has been activated prior to contact with said eluate by a HCl-water solution.

3. Process according to claim 2, wherein said HCl-water solution is the effluent from the wash filter of a chlorine bleaching step of said bleach plant.

4. Process according to claim 1, wherein said fore-cut is used to acidify said effluent to adjust the pH value thereof prior to passage through said resin bed.

5. Process according to claim 1, wherein said outer cut is used to eluate and/or wash said resin bed.

6. Process according to claim 1, wherein said central cut is acidified to a pH value between 0.5 and 1.5 to precipitate said solids.

7. Process according to claim 1, wherein said precipitate is dissolved by admixing with black liquor.

8. Process according to claim 1, wherein said solids in said central cut are precipitated by the addition of rest acid to said central cut.

9. In a process for purifying a dark colored effluent of a chlorine based pulp mill bleaching plant, said effluent containing chlorine and colored lignin degradation product pollutants, said process comprising passing the effluent through a resin bed of an activated particulate, weakly basic anion exchange resin to retain said colored lignin degradation product pollutant in the resin bed until the resin has become saturated with said pollutants to a given degree, wherein said resin has been activated by the HCl-water solution effluent from the wash filter of the chlorine bleaching step of said bleach plant, eluting the resin bed with an alkaline solution to release said pollutants therefrom, and disposing of the eluate, the improvements comprising separating the eluate released from the resin bed into fractions by color pattern, said fractions comprising a fore-cut (start fraction), an outer cut (end fraction), and a central cut, wherein the central cut comprises that portion of the eluate between about the first bed volume of eluate to about 1.8 to 2.4 bed volumes of eluate, said central cut containing that portion of the eluate having the highest color concentration of any portion of the eluate and also containing a volume of eluate on either side of said portion of the eluate, and acidifying said central cut to a pH of less than about 2 to precipitate at least a majority of the total solids of the acidified effluent without precipitating solids in said fore-cut or said outer cut, separating the precipitate from the remainder of the central cut, said remainder containing the majority of inorganic chlorine of said central cut, and disposing of said precipitate.

* * * * *